Patented Sept. 8, 1936

2,053,275

UNITED STATES PATENT OFFICE 2,053,275

MANUFACTURE AND APPLICATION OF ARYLAMINO ANTHRAQUINONE DYESTUFFS

George Holland Ellis and Frank Brown, Spondon, near Derby, England, assignors to Celanese Corporation of America, a corporation of Delaware No Drawing. Application February 7, 1933, Serial No. 655,617. In Great Britain February 17, 1932

20 Claims. (Cl. 260—59)

This invention relates to the colouration of cellulose ester and ether and other materials and to the production of new dyestuffs.

The amino and simple alkylamino derivatives of anthraquinone, for example 1,4-dimethylamino anthraquinone, are of value for the colouration of cellulose ester and ether materials in that by their aid it is possible to secure by direct dyeing methods shades of blue difficult to secure by means of other direct dyeing dyestuffs. Many of these dyeings however, while reasonably fast to most of the agencies which textile materials are commonly required to withstand, suffer from a lack of resistance to the combined action of light and acid, for instance combustion products of coal gas. This lack of resistance is particularly objectionable in that in general it involves a considerable change in shade towards red and not merely a reduction in the intensity of the dyeing. A considerable improvement in respect of resistance to the combined action of acid and light may be effected in the case of amino anthraquinone derivatives by introducing an aryl residue into one or more amino groups. The dyestuffs thus obtained offer extremely good resistance to acid and light, but unfortunately their affinity for cellulose ester and ether materials is often so low as to render them of little commercial value except possibly for the production of pale shades.

We have now found that the introduction of acidylamino groups into aryl residues of arylamino anthraquinones is capable of effecting a marked improvement in the affinity of these compounds for cellulose ester and ether materials. Thus, for example, whereas 1-hydroxy-4-phenylamino anthraquinone exhibits very low affinity for cellulose esters and ethers, 1-hydroxy-4-(acetylamino-phenylamino)-anthraquinone exhibits a relatively good affinity. Moreover, this increase of affinity is not obtained at the expense of material reduction in the resistance of the dyestuffs to the combined agencies of acid and light.

Broadly, therefore, our invention comprises the colouration of cellulose ester or ether or other materials by means of arylamino anthraquinone derivatives substituted in at least one aryl residue by an acidylamino group. The invention also comprises new anthraquinone dyestuffs containing arylamino groups substituted in the aryl residues by acidylamino groups.

The acidylamino groups present as substituents in the arylamino residues may be of any desired character, for example the acidyl groups may be of the aliphatic series, for example acetyl, formyl, propionyl or the like or they may be of the aromatic series, for instance benzoyl, or substituted benzoyl groups. Moreover, the acidylamino groups may be derived from either primary or secondary amino groups, for instance they may be acetyl methylamino groups or other acidyl alkyl-amino groups. Further, the acidylamino groups may be in any desired position in the aryl residue, for example ortho, meta, or para to the amino group in the case of an aryl residue of the benzene series. Again, they may be accompanied in the aryl group by other substituents, for example halogen or nitro groups or by alkoxy or other ether groups or alkyl groups in the meta position to the amino group attached to the anthraquinone residue.

The aryl groups may be of any desired series, for example of the naphthalene series. Preferably, however, the aryl groups are of the benzene series.

The introduction of acidylamino groups into the arylamino groups of the dyestuff molecule has been found of particular value in connection with the 1-hydroxy-4-arylamino anthraquinones. As examples of colouring matters of this type falling within the scope of the invention reference may be made, in addition to the above mentioned 1-hydroxy-4-(acetylamino-phenylamino)-anthraquinone, to 1-hydroxy-4-(4'-acetylamino-3'-methyl-phenylamino)-anthraquinone. Other substituents may if desired be present in the anthraquinone nucleus, for example hydroxyl or amino groups, and as an example of such nuclear substituted products mention may be made of 1-(p-acetylamino-phenylamino) 4,5-dihydroxy-anthraquinone.

The invention is not, however, restricted to dyestuffs of the 1-hydroxy-4-arylamino anthraquinone type as the hydroxy and arylamino substituents may be present in other relative positions, and further hydroxyl groups may be absent or replaced by other substituents, particularly amino groups, or aliphatically substituted amino groups e. g. alkylamino or hydroxyalkyl amino groups such as methylamino or hydroxyethylamino. As examples of compounds of the latter character mention may be made of 1-amino-4-para-acetylamino-phenylamino anthraquinone.

Where two or more arylamino groups are present in the dyestuff molecule, acidylamino groups may be present in one or more than one of them. Further, the arylamino residues may be identical or they may differ one from the other either in respect of the nuclei or in respect of their mode of substitution. Thus, for instance, in the case of a diarylamino compound one aryl residue may contain an acidylamino group or groups while the other may be unsubstituted or substituted for instance by an alkoxy group in the ortho position or a methyl group in the meta-position.

We have further found that an increase in affinity for cellulose esters or ethers of arylamino anthraquinones may also be secured by introduction of acidylamino groups, especially aliphatic acidylamino groups, into the anthraquinone nuclei and such dyestuffs are also within the scope of the invention.

Any desired methods may be employed for the production of these arylamino anthraquinones substituted in the nucleus or aryl residue by acidylamino groups, for example, any of the known methods for synthesizing arylamino anthraquinone derivatives. Thus, reactive groups present as substituents in anthraquinone derivatives may be replaced by arylamino residues of the desired character by the action of appropriate acidylamino substituted aromatic amines, for example p-amino acetanilide, mono-acetyl-m-phenylene diamine, or mono-acetyl-p-toluylene diamine. Again, amino anthraquinones may be subjected to the action of agents capable of introducing into an amino group an aryl residue substituted in the desired manner.

As examples of atoms or groups readily replaceable by arylamino residues mention may be made of nitrohydroxy, amino, chlorine or other halogen atoms, and sulphonic groups. As examples of specific compounds containing such reactive atoms or groups reference may be made to 1-amino-4-hydroxy or alkoxy anthraquinone, 1-amino-4-nitro-anthraquinone, 1,5-dinitro-4,8-diamino-anthraquinone, 1,8-dinitro-4,5-diaminoanthraquinone, 1-amino-4-brom-anthraquinone, 1-hydroxy-4-chlor- or 4-brom-anthraquinone, 1,4-dihydroxy-anthraquinone, 1,5- or 1,8-dinitro-anthraquinone, 4-nitro- or 4-amino-chrysazin, or 4-nitro- or 4-amino-anthrarufin, 4,5-dinitro- or 4,5-diamino-chrysazin, 4,8-dinitro- or 4,8-diamino-anthrarufin, 4-chlor-chrysazin or 4-chlor-anthrarufin, 1,5- or 1,8-dichlor-anthraquinone or their 4-amino derivatives and 5,8-dichlor-1,2-benzanthraquinone.

1-hydroxy-4-p-acetylamino-phenylamino anthraquinone is conveniently obtained by the action of p-amino-acetanilide on 1-hydroxy-4-chlor-anthraquinone in nitrobenzene in presence of sodium acetate and copper acetate.

In addition to replacing one or more reactive groups by acidylamino-arylamino residues other of the reactive groups may be replaced by other substituents before or after the introduction of the arylamino residue. Thus, for instance, reactive substituents may be replaced by primary amino groups or by alkyl or substituted alkyl-amino groups. For instance, a nitro group may be reduced to amino or a nitro or hydroxy group or a halogen atom may be replaced by amino or aliphatically substituted amino groups by reaction with ammonia or an aliphatic amine, e. g. methyl amine or hydroxyethylamine.

The replacement of hydroxyl groups by amino or hydroxyl and amino groups by substituted amino groups by the direct action of ammonia or substituted ammonia may frequently be facilitated by first reducing the anthraquinone compound to a leuco derivative. Such is especially the case when compounds contain hydroxyl or hydroxyl and amino groups in the 1,4-positions. The amidation of reduced hydroxy anthraquinone compounds may if desired be effected in the presence of inorganic alkali in the manner described in U. S. Patent No. 1,969,748.

If desired, instead of introducing acidylamino-arylamino residues into anthraquinone compounds, the acidylamino groups may be introduced into aryl residues of already prepared arylamino anthraquinones. Thus, suitable substituents present in the aryl residues may be converted into or replaced by acidylamino groups. For example, a primary or secondary amino group may be acidylated. For instance, 1-hydroxy-4-p-acetylamino-phenylamino-anthraquinone may be obtained by condensing 1-hydroxy-4-chloranthraquinone with p-phenylenediamine and acetylating the product.

Again, acidylamino-arylamino-anthraquinones may be produced by methods involving synthesis or production of the anthraquinone nucleus itself, for example by ring closure of an appropriate substituted benzoyl benzoic acid.

The new colouring matters, as indicated above, are of especial value, particularly when unsulphonated, for the colouration of cellulose acetate and other cellulose ester or ether materials. As examples of such other esters and ethers reference may be made to cellulose formate, propionate or butyrate or the products obtainable by treating alkalized cellulose with esterifying agents or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

The said colouring matters may be applied to textile materials either in the reduced state, that is, by a vat process or in the form of free leuco compounds in the manner described in U. S. Patent No. 1,900,172, or they may be applied in solution where sufficiently soluble, in aqueous suspension, or after being brought into colloidal form.

For convenience in application, the new colouring matters may be converted into concentrated or other preparations, whether liquid or solid or semi-solid, in which the colouring matters are present in the reduced or unreduced state and in colloidal, dispersed, or other finely divided condition. Such preparations are included within the scope of the invention and may be prepared, for example, by grinding (e. g. in colloid mills), by dissolving in a solvent and mixing with water containing or not containing protective colloids and/or dispersators, or by treatment with dispersing agents whether alone or in the presence of protective colloids and/or liquids, e. g. water. Preparations intended for vatting may contain reducing agents, alkali or the like, e. g. alkali salts of hydroxy and polyhydroxy cyclic compounds (see U. S. Patent No. 1,716,720). As examples of dispersing agents or protective colloids mention may be made of the following:—

Sulphoaromatic fatty acid compounds, e. g. sulpho-benzene palmitic acid compounds (see U. S. Patent No. 1,694,413).

Sulphoaromatic ricinoleic acid compounds, e. g.

sulpho-naphthalene-ricinoleic acid, (see U. S. Patent No. 1,840,572).

Naphthenic acids or other carbocyclic compounds containing salt-forming groups or salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. Patent No. 1,928,647).

Resino-naphthalene sulphonic acid compounds (see U. S. Patent No. 1,959,352).

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. lignin sulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water, the aforesaid preparations containing unreduced colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The colouring matters may be applied to the materials in any desired manner, for example, by dyeing or other method of uniform application, or by printing, stencilling or other method of local application. If desired, the new colouring matters may be employed for the colouration of stannous chloride discharges in the manner described in prior U. S. Patent No. 1,949,413.

The invention is illustrated but not limited by the following examples:—

*Example 1*

Preparation of 1-hydroxy-4-(4'-acetylamino-phenylamino)-anthraquinone.

| | Parts |
|---|---|
| 1-hydroxy-4-chloro-anthraquinone | 40 |
| Para-phenylenediamine | 60 |
| Sodium acetate | 20 |
| Copper acetate | 1 |
| Amyl alcohol | 160 | are boiled together with good stirring till practically no unchanged 1-hydroxy-4-chlor-anthraquinone remains, which will be found to be the case at the end of about 20 hours. Upon cooling, the 1-hydroxy-4-(4'-amino-phenylamino)-anthraquinone separates and is filtered off, dried, and acetylated by boiling 1 part for two hours with two parts of acetic anhydride and 2 parts of glacial acetic acid. The new dyestuff is isolated by pouring the acetylation mixture into water and filtering. It crystallizes from chlorbenzene in small blackish needles with a metallic lustre.

*Example 2*

Preparation of 1,8-dihydroxy-4-(4'-acetyl-amino-phenylamino)-anthraquinone.

In the above example the 1-hydroxy-4-chloranthraquinone is replaced by an equal quantity of parachlorchrysazin, and by working in an analogous manner there is obtained 1,8-dihydroxy-4-(4'-acetylamino-phenylamino)-anthraquinone. In place of organic diluents the condensation with p-phenylenediamine can be brought about in aqueous media, for example in 20% caustic soda solution, the acetylation of the free amino-phenylamino compound being effected as before.

*Example 3*

To dye 10 kilograms of cellulose acetate knit fabric a bright blue-violet shade:—

100 grams of finely powdered 1-hydroxy-4-(p-acetylamino-phenylamino)-anthraquinone are boiled with an equal quantity of pyridine and diluted with boiling 2.5 g. p. l. soap solution. The resulting dispersion is passed through a filter cloth into a hot dye bath containing 300 litres of 2.5 g. p. l. soap solution. The previously scoured cellulose acetate fabric is now entered in rope form, the temperature being raised to 80° C. and maintained thereat for 1½ hours, or till the requisite shade is achieved. The goods are now washed off thoroughly and dried or otherwise treated as desired or requisite.

For printing the dyestuff is best prepared as a finely divided 20% aqueous paste, which is suitably incorporated with gum thickening, with or without swelling agents for cellulose acetate, and may be printed, steamed, etc. according to known technique.

What we claim and desire to secure by Letters Patent is:—

1. As a new product, an arylamino anthraquinone having an acidylamino group as a substituent in an aryl radical of an arylamino group.

2. As a new product, an unsulphonated anthraquinone compound having as substituents in an anthraquinone nucleus a hydroxyl group and an arylamino group substituted in the aryl radical by an acidylamino group.

3. As a new product, an unsulphonated anthraquinone compound having as substituents in alpha positions of an anthraquinone nucleus a hydroxyl group and an arylamino group substituted in the aryl radical by an acidylamino group.

4. As a new product, an unsulphonated anthraquinone compound having as substituents in alpha positions of an anthraquinone nucleus a hydroxyl group and an arylamino group of the benzene series substituted in the benzene radical by an aliphatic acidylamino group.

5. As a new product, an unsulphonated 1-hydroxy-4-phenylamino-anthraquinone substituted in the phenyl radical by an acidylamino group.

6. As a new product, a 1-hydroxy-4-phenyl-amino-anthraquinone substituted in the phenyl radical by an acetylamino group.

7. As a new product, 1-hydroxy-4-(p-acetyl-amino-phenylamino)-anthraquinone.

8. As a new product, 1,8-dihydroxy-4-(p-ace-tylamino-phenylamino)-anthraquinone.

9. Process of producing an arylamino-anthraquinone compound having an acidylamino group as a substituent in an aryl radical of an arylamino group from an acidylating agent, an aromatic diamine and an anthraquinone compound containing a substituent capable of replacement by an arylamino group by the action of an arylamine, which comprises causing the aromatic diamine to react with one of the remaining two components and the resulting compound to react with the other.

10. Process of producing an unsulphonated anthraquinone compound having as substituents a hydroxyl group and an arylamino group, of which the aryl radical contains an acidylamino group as a substituent, from an acidylating agent, an aromatic diamine and an anthraquinone compound containing a hydroxyl group and a substituent capable of replacement by arylamino by the action of an arylamine, which comprises causing the aromatic diamine to react with one of the remaining two components and the resulting compound to react with the other.

11. Process for the production of an unsulphonated anthraquinone compound having as substituents a hydroxyl group and an arylamino group, the aryl radical of which contains an acidylamino group as a substituent, which comprises subjecting to the action of a mono-acidylated aromatic diamine an anthraquinone compound containing a hydroxyl group and a substituent capable of replacement by an arylamino group by the action of an arylamine.

12. Process for the production of an unsulphonated 1-hydroxy-4-arylamino-anthraquinone having an acidylamino group as substituent in the aryl radical of the arylamino group, which comprises subjecting to the action of a mono-acidylated aromatic diamine an unsulphonated 1-hydroxy-anthraquinone having in the 4-position a substituent capable of replacement by arylamino by the action of an arylamine.

13. Process for the production of an unsulphonated 1-hydroxy-4-phenylamino-anthraquinone, having an aliphatic acidylamino group as a substituent in the phenyl radical, which comprises subjecting to the action of a mono-aliphatic-acidyl derivative of a diamino benzene an unsulphonated 1-hydroxy-anthraquinone having in the 4-position a substituent capable of replacement by arylamino by the action of an arylamine.

14. Process for the production of an unsulphonated 1-hydroxy-4-phenylamino-anthraquinone having an acetylamino group as a substituent in the phenyl radical, which comprises subjecting 1-hydroxy-4-chlor-anthraquinone to the action of a mono-acetyl-diamino-benzene.

15. Process for the production of 1-hydroxy-4(p-acetylamino-phenylamino)-anthraquinone which comprises subjecting 1-hydroxy-4-chlor-anthraquinone to the action of mono-acetyl-p-phenylene-diamine.

16. Process for the production of an unsulphonated 1-hydroxy-4-phenylamino-anthraquinone having an acidylamino group as a substituent in the phenyl radical, which comprises subjecting an unsulphonated leuco 1,4-dihydroxy-anthraquinone to the action of a mono-acidylated-diamino-benzene.

17. Process for the production of an unsulphonated arylamino-anthraquinone having an acidylamino group as a substituent in an aryl radical of an arylamino group, which comprises acidylating an amino group present as a substituent in an aryl radical of an arylamino-anthraquinone.

18. Process for the production of an unsulphonated α-hydroxy-α-arylamino-anthraquinone having an acidylamino group as a substituent in the aryl radical of an arylamino group, which comprises acidylating an α-hydroxy-α-arylamino-anthraquinone having an amino group as a substituent in an aryl radical of an arylamino group.

19. Process for the production of an unsulphonated 1-hydroxy-4-phenylamino-anthraquinone having an acetylamino group as a substituent in the phenyl radical, which comprises acetylating an unsulphonated 1-hydroxy-4-(amino-phenylamino)-anthraquinone.

20. Process for the production of 1-hydroxy-4-(p-acetylamino-phenylamino)-anthraquinone, which comprises acetylating 1-hydroxy-4-(p-amino-phenylamino)-anthraquinone.

GEORGE HOLLAND ELLIS.
FRANK BROWN.